Aug. 13, 1957 — G. M. LANCE — 2,802,456
PILOT VALVE

Filed Feb. 21, 1955 — 2 Sheets-Sheet 1

INVENTOR.
GEORGE M. LANCE
BY Hudson, Boughton,
Williams, David & Hoffmann
ATTORNEYS Aug. 13, 1957  G. M. LANCE  2,802,456
PILOT VALVE
Filed Feb. 21, 1955  2 Sheets-Sheet 2
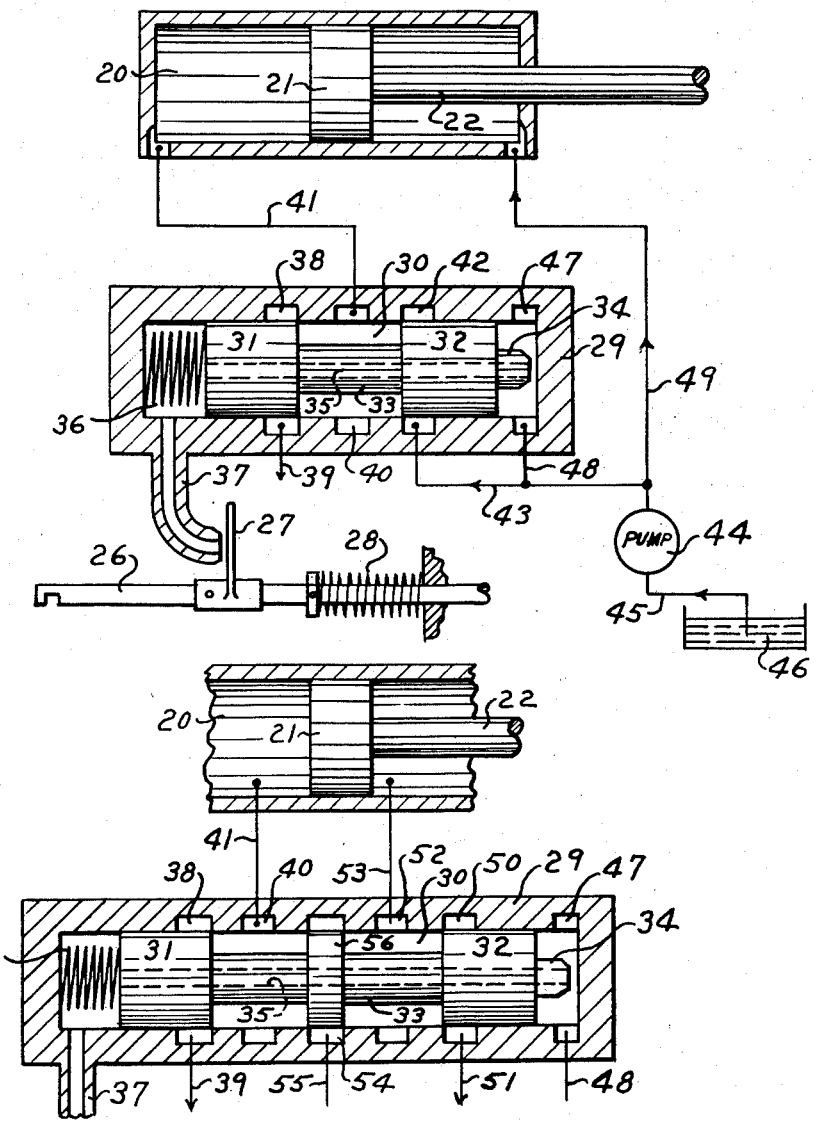
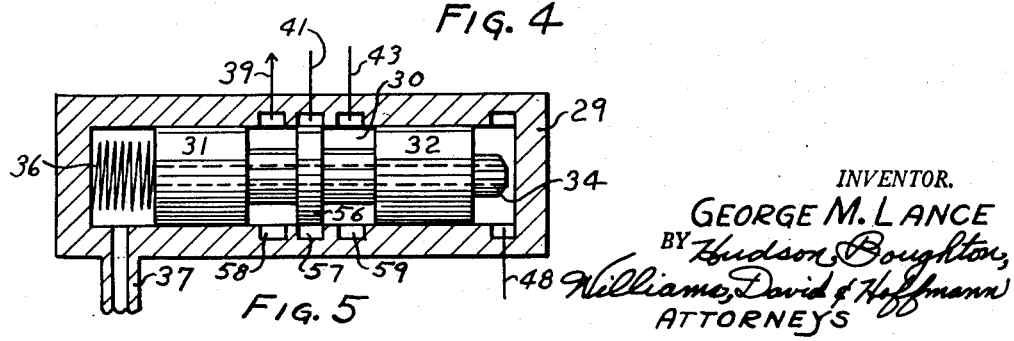
INVENTOR.
GEORGE M. LANCE
ATTORNEYS United States Patent Office 2,802,456
Patented Aug. 13, 1957

2,802,456
PILOT VALVE

George M. Lance, Euclid, Ohio, assignor to The Warner & Swasey Company, Cleveland, Ohio, a corporation of Ohio Application February 21, 1955, Serial No. 489,396

10 Claims. (Cl. 121—45)

This invention relates to a pilot valve used in fluid operated power systems to control the movements of a motor.

The invention for purposes of illustration is shown herein as utilized in a contour following arrangement for a machine tool to control the movements of the motor which actuates a slide, although it will be understood that the invention is susceptible of utilization in various other environments.

More particularly the invention relates to a flapper controlled pilot valve for controlling the movements of a motor.

An object of the invention is to provide a flapper controlled pilot valve in a fluid operated power system which will be very sensitive in controlling the movements of a motor and which provides for the obtainance of a modulating or throttling of the flow of fluid pressure in response to the motion of the flapper forming the controlling part of the pilot valve.

A further object is to provide a flapper controlled pilot valve which can be advantageously used to control the motions of a motor since the operation of the flapper requires very little power for its displacing movements that control in turn the operation of the pilot valve.

Another object is to provide an improved and novel flapper controlled pilot valve of the type referred to and wherein no linkage is required to operate the pilot valve body thereby increasing the efficiency of the pilot valve because of the elimination of linkage lost motion and linkage friction.

A still further object is to provide a flapper controlled pilot valve wherein the valve body of the pilot valve is in part fluid pressure actuated under the control of the movements of the flapper which, as already pointed out, require very small forces to move the same, which means that the pressures acting on the valve body of the pilot valve can be high relative to the moving forces acting on the flapper.

A further object is to provide a flapper controlled pilot valve for controlling a motor and which valve is particularly useful for controlling the motor that actuates the tool carrying slide in a contour following device under the control of a template and stylus or follower, inasmuch as the valve enables extremely sensitive control movements to be imparted to the slide in response to the contour variations of the template.

Further and additional objects and advantages not hereinbefore referred to will become apparent hereinafter during the detailed description of several embodiments of the invention which is to follow and which embodiments are illustrated in the accompanying drawings forming a part of this specification and wherein:

Fig. 3 is a schematic view of one form of flapper controlled pilot valve embodying the invention with the pilot valve and the fluid pressure motor in this instance which it controls shown in section, said motor having constant pressure on one side of the piston and controlled variable pressure on the other side of the piston.

Fig. 4 is a sectional view of a modified form of pilot valve from that shown in Fig. 3 and schematically shows its use with a fluid motor having controlled variable pressures on both sides of the piston, and Fig. 5 is a sectional view of a still different form of pilot valve embodying the invention from that illustrated in the previous views but susceptible of use in controlling a fluid motor of the type shown in Fig. 3.

The term "motor" used herein is intended to include any form of power device whether electrical, mechanical or fluid. Although a fluid motor is illustrated it should be understood such motor could be any other form of power device.

Figure 1:
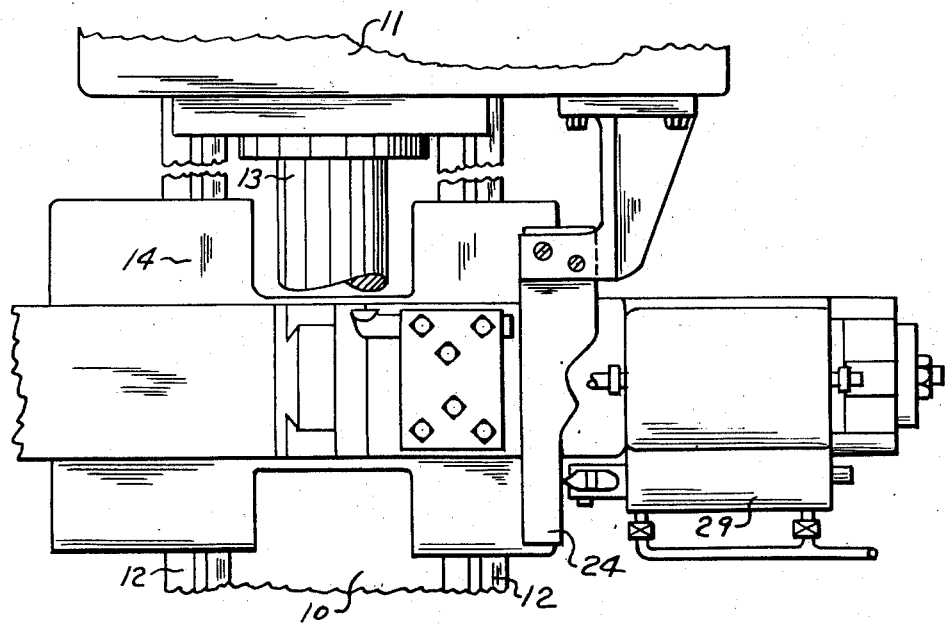
Fig. 1 is a fragmentary top plan view of a machine tool provided with a contour following arrangement for a transversely movable slide of the machine tool and in which arrangement a pilot valve embodying the invention can be utilized for controlling the motor that actuates the slide.
Figure 2:
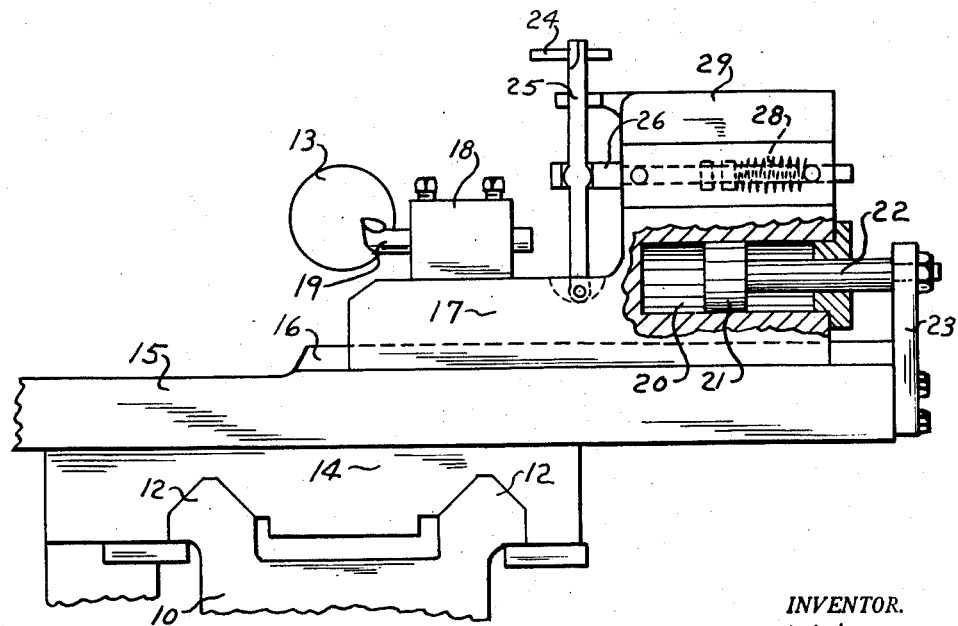
Fig. 2 is an elevational view of the machine tool shown in Fig. 1 with a portion of the tool carrying slide and the motor for moving the same shown in section.

Referring first to Figs. 1 and 2 showing, for purposes of illustration, a machine tool having a contour following arrangement in which a pilot valve embodying the invention can be used, 10 indicates the bed of the machine tool and 11 the headstock thereof. The bed 10 is provided with parallel longitudinally extending front and rear ways 12 which are parallel to the axis of the work spindle in the head stock and the axis of the work 13 carried by the spindle and projecting over the bed 10. A carriage 14 extends transversely of the bed 10 and is supported by the ways 12 for movement longitudinally of the bed. The carriage 14 mounts a cross slide 15 for movement transversely of the bed and carriage and said cross slide 15 is provided on its upper side with a dovetail guideway 16 on which a contour slide 17 is slidably mounted for movement lengthwise of the cross slide and transversely of the bed as will be well understood in the art.

The contour slide 17 is provided with an adjustable tool support 18 mounting a tool 19 for operation on the rotating work piece 13. The contour slide 17 is shown as provided with a cylinder 20 in which a piston 21 is located that is fixed to the inner end of a piston rod 22, the outer end of which is fixedly connected through a bracket 23 to the cross slide 15.

The movements of the slide 17 through the flow of fluid pressure to the cylinder 20 are controlled by a flapper controlled pilot valve embodying the invention and the latter, in turn, is controlled by a contour following arrangement comprising a template 24 shown as secured to the headstock and engageable by the feeler or stylus at the upper end of a stylus lever arm 25, the lower end of which is pivoted to the contour slide 17. The arm 25 intermediate its ends is provided with a rounded portion that is located in a slot formed in a slidable rod 26 that carries or is operatively connected with a flapper 27 that controls the pilot valve. A spring 28 on the rod 26 functions to maintain the feeler at the upper end of the arm 25 in contact with the template 24.

The flapper controlled pilot valve shown in Fig. 3 comprises a housing 29 having a chamber 30. The valve body of the pilot valve includes end lands 31 and 32 slidable in the chamber 30 and interconnected by a shaft 33. The outer end of the end land 32 is provided with a feed-back nozzle 34. The valve body is provided with a small bore 35 of predetermined diameter extending centrally of the body from the end of the nozzle 34 through the land 32, shaft 33 and land 31.

A coil spring 36 is interposed between the end land 31 and the end of the chamber 30. The housing 29 is provided with an outlet control nozzle 37 communicating with the chamber 30 at the end thereof containing the spring 36 and having its outer end located at a predetermined but close distance from the flapper 27 when the latter is in its normal or central position. The wall of the chamber 30 of the pilot valve is provided with an annular groove 38 normally covered by the end land 31 and connected to a drain conduit 39. The wall of the chamber 30 to the right of the groove 38 as viewed in Fig. 3 is provided with an annular groove 40 that is connected by a conduit 41 to the end of the cylinder 20 of the motor that is on the large projected piston area side of the piston.

The wall of the chamber 30 of the pilot valve is further provided to the right of the groove 40 with an annular groove 42 that is controlled by the end land 32 and which is connected to a conduit 43 that extends to the output side of a fluid pressure pump 44, the input side of which is connected by a line 45 to a sump or reservoir 46. The wall of the chamber 30 of the housing 29 at the end thereof adjacent to the feed-back nozzle 34 is provided with an annular groove 47 connected by a short conduit 48 to the line pressure conduit 43, wherefore said end of the chamber is always subject to constant fluid pressure.

The output side of the pump 44 is connected by a conduit 49 to that end of the cylinder 20 which is on the small projected piston area side of the piston and hence said end of the cylinder is always subject to constant line fluid pressure.

The operation of the pilot valve shown in Fig. 3 will be described herein in connection with the machine tool shown in Figs. 1 and 2 and for illustrative purposes as controlling the operation of the fluid motor that moves the contour slide 17.

It may be assumed that the machine tool shown in Figs. 1 and 2 is operating and that the cutting tool 19 is in machining engagement with the workpiece 13 while the stylus at the upper end of the arm 25 is contacting the contouring edge of the template 24 which at this time is of such configuration that the arm 25 is substantially in vertical position and the flapper 27 is in its normal or central position.

It may now be assumed that the configuration of the contouring edge of the template changes so that the arm 25 is moved in a counterclockwise direction under the action of the spring 28 with a resultant movement of the rod 26 and flapper 27 toward the left as viewed in Fig. 3. Such movement of the flapper causes it to approach the end of the outlet control nozzle 37 and to decrease the outflow of fluid pressure therefrom, it being understood that line fluid pressure from the conduit 48 is flowing into the chamber 30 and thence through the bore 35 to the nozzle 37.

It should be borne in mind that prior to the movement of the flapper the valve body of the pilot valve was in the central position shown in Fig. 3, inasmuch as equalized end forces were acting on the ends of the lands 31 and 32, with the force on the land 31 being a combined fluid and spring force and the force on the land 32 being a fluid pressure force.

When the flapper 27 moves from its central or normal position toward the left, as viewed in Fig. 3, and the end of the conrol nozzlet 37 to throttle the outflow of pressure fluid from the nozzle there occurs a build-up of fluid pressure force in the end of the chamber 30 containing the spring 36. This build-up of the fluid pressure force just referred to causes the combined fluid pressure and spring pressure forces acting on land 31 to exceed the fluid pressure force acting on the land 32. This causes the valve body to shift toward the right from its central position. This shifting of the valve body partially exposes the groove 42, whereupon line pressure from the conduit 43 passes through the chamber 30 and through the conduit 41 to that end of the cylinder 20 on the large projected piston area side of the piston 21 and due to the differential in area of the opposite sides of the piston 21 this pressure causes the cylinder 20 and the slide 17 and cutting tool 19 to move inwardly toward the axis of the workpiece.

The displacement of the valve body toward the right as just referred to causes the end of the feed-back nozzle 34 to come closer to the end of the chamber 30 and thus to throttle the flow of fluid pressure through the bore 35 to the opposite end of the chamber. This builds up a pressure force acting on the land 32 in opposition to the forces acting on land 31. The valve body will continue to move toward the right until the build-up of the pressure force acting on the land 32 equalizes the forces acting on the land 31 and when this balance of forces on the lands 32 and 31 occurs no further movement of the valve body toward the right takes place.

Now assuming that the configuration of the contouring edge of the template 24 becomes such that the arm 25 returns to substantially vertical position, it will be understood that the flapper 27 moves toward the right away from the end of nozzle 37 and to its normal or central position. This allows a freer flow of fluid pressure out of the nozzle 37 with a resultant decrease of the fluid pressure force acting on land 31. The result is an unbalancing in the forces acting on lands 32 and 31 so that the fluid pressure force acting on land 32 moves the valve body toward the left until the forces acting on lands 31 and 32 are again in balance. This will occur when the valve body is in its central position, as indicated in Fig. 3, at which time the conduit 41 is disconnected from line pressure.

Now assuming that the configuration of the contouring edge of the template 24 becomes such that the arm 25 is moved in a clockwise direction, it will be seen that the flapper 27 moves from its central or normal position toward the right and away from the end of the nozzle 37. Thereupon the fluid pressure flow from the nozzle 37 is accelerated to reduce the fluid pressure in the end of the chamber 30 at which the spring 36 is located. This lessens the combined fluid pressure and spring pressure forces acting on land 31 to unbalance the forces acting on lands 31 and 32 until the fluid pressure force acting on land 32 shifts the valve body toward the left. This shifting of the valve body toward the left causes the land 31 to uncover groove 38 whereupon line 41 is connected to drain line 39 and this causes movement of the piston 21 of the motor toward the left as viewed in Fig. 3. The shifting of the valve body toward the left continues until the combined fluid pressure and spring pressure forces acting on land 31 balance the fluid pressure force acting on land 32.

When the configuration of the contouring edge of the template 24 varies in a manner such that the arm 25 again moves counterclockwise to vertical position the flapper 27 moves from its right hand displaced position toward the left and the end of the nozzle 37 and into its central or normal position. This movement of the flapper causes the forces acting on lands 31 and 32 to again become unbalanced and the combined fluid pressure and spring pressure forces acting on land 31 move the valve body toward the right to central or normal position at which time the forces acting on the lands 31 and 32 are again in balance.

In Fig. 4 a slightly different form of pilot valve embodying the invention is illustrated and the difference in this pilot valve over the pilot valve shown in Fig. 3 is primarily to adapt the modified form of pilot valve to control a fluid motor wherein the opposite ends of the cylinder can be selectively connected to line pressure or to drain while in the first described form one end of the cylinder was always connected to line pressure while the opposite end thereof was connected to variable pressure.

With the exception just stated the valve of Fig. 4 is substantially the same as the previously described form and insofar as the parts are identical the same reference numerals are applied thereto. The valve body comprises the end lands 31 and 32 interconnected by a shaft 33 and having the longitudinally extending bore 35 through the valve body and the feed-back nozzle 34. The valve housing 29 is also provided with the outlet control nozzle 37 which communicates with that end of the chamber 30 containing the coil spring 36 that acts on the end land 31. The other end of the chamber is provided with the annular groove 47 that communicates with the conduit 48 that is connected to line fluid pressure at all times. Also the wall of the chamber 30 is provided with the annular groove 38 that is connected to conduit 39 that extends to drain and said annular groove 38 is normally closed by the end land 31. In addition, the wall of the chamber 30 has the annular groove 40 to the right of the annular groove 38 and which groove 40 is connected to conduit 41 that extends to the cylinder 20 on the large projected piston area side of the piston.

In the form of valve shown in Fig. 4 the wall of the chamber 30 is provided with an annular groove 50 that communicates with a conduit 51 extending to drain and which groove 50 is normally closed by the end land 32. The wall of the chamber 30 of this modified form of valve to the left of the groove 50 is provided with an annular groove 52 that communicates with a conduit 53 that extends to that end of the cylinder 20 that is on the small projected piston area side of the piston. In the modified form of valve the wall of the chamber 30 intermediate the grooves 40 and 52 is provided with an annular groove 54 that communicates with a conduit 55 that is connected to line fluid pressure and said groove 54 is normally closed by a central land 56 mounted on the shaft 33 of the valve body.

It will be readily appreciated that the operation of the form of pilot valve shown in Fig. 4 is substantially the same as in the previously described form with the exception that when the valve is shifted from central position to the right line fluid pressure from conduit 55 passes through the chamber 30 and through the conduit 41 to the left-hand end of the cylinder 20 to move the slide 17 and cutting tool 19 inwardly toward the axis of the work. It will also be understood upon the right-hand displacement of the valve body the end of the cylinder 20 on the small projected piston side of the piston is connected through the conduit 53 with drain conduit 51.

It will be understood that when the valve body shifts from central position to left-hand displaced position that then line conduit 55 will be connected through conduit 53 to the end of the cylinder 20 on the small projected piston area side of the piston 21 while the opposite end of the cylinder 20 will be connected through conduit 41 to drain conduit 39. This last mentioned displacement of the valve body causes the cylinder, slide 17 and cutting tool 19 to move outwardly.

The pilot valve embodying the invention and shown in Fig. 5 is of a form somewhat similar to that described in Fig. 3 but contains the central land 56 of the form shown in Fig. 4. However, the pilot valve shown in Fig. 5 is adapted to control a fluid motor wherein one end of the cylinder is subject at all times to constant line fluid pressure as in Fig. 3 while the opposite end of the cylinder is subject to variable fluid pressure. Insofar as the parts of the pilot valve shown in Fig. 5 are identical to those shown in Figs. 3 and 4 the same reference characters are applied.

The central land 56 of the valve shown in Fig. 5 normally closes the annular groove 57 formed in the wall of the chamber and communicating with the conduit 41 that extends to that end of the cylinder 20 on the large projected piston area side of the piston 21. The wall of the chamber 30 of the valve of Fig. 5 intermediate the central land 56 and the end land 31 is provided with an annular groove 58 that communicates with drain conduit 39. Also the wall of the chamber 30 of this form of valve is provided with an annular groove 59 located intermediate the central land 56 and the end land 32 and communicating with line conduit 43 of the first described form.

It will be seen that when the valve body of the valve of Fig. 5 is displaced from central position toward the right that then conduit 41 will be connected with drain conduit 39 and when it is displaced from central position toward the left then line conduit 43 will be connected to conduit 41. Consequently the pilot valve of Fig. 5 will function to control the operation of the fluid motor shown in Fig. 3 in the same way as does the pilot valve shown in Fig. 3.

Although several embodiments of the invention have been illustrated and described herein it will be understood that the invention is susceptible of various modifications and adaptations within the scope of the appended claims.

Having thus described my invention, I claim:

1. A pilot valve for controlling a motor and comprising a housing having a chamber therein operatively connected with said motor, means for connecting one end of said chamber to a source of constant fluid pressure, said housing being provided with an outlet control nozzle communicating with the other end of said chamber, a shiftable valve body in said chamber and including at its opposite ends lands slidable therein, one land at said one end of said chamber being provided with a feed-back nozzle extending toward said one end of said chamber, spring means in the other end of said chamber acting on the other of said lands in opposition to the force acting on said one land, an uninterrupted bore communicating with said feed-back nozzle and extending longitudinally completely through said valve body and communicating with the said other end of said chamber, and a control element cooperating with the outlet end of said outlet control nozzle and movable from a central normal position toward or away from said outlet end of said control nozzle to throttle or accelerate the normal outward flow of pressure fluid therefrom to automatically cause shifting of the valve body in either direction from a central or normal position thereof.

2. A pilot valve as defined in claim 1 and wherein said control element is a flapper member extending substantially perpendicularly transversely to the outlet end of said outlet control nozzle and movable from a central or normal position toward or away from said outlet end to throttle or accelerate the normal outward flow of pressure fluid therefrom to automatically cause shifting of the valve body in either direction from a central or normal position thereof.

3. A pilot valve as defined in claim 1 and wherein the wall of said chamber is provided with grooves covered by said end lands when said valve body is in central or neutral position.

4. A pilot valve as defined in claim 3 and wherein the wall of said chamber is provided with a central groove while said valve body is provided with a central land covering said central groove when said valve body is in central or neutral position.

5. A pilot valve as defined in claim 1 and wherein the wall of said chamber is provided with grooves covered by said end lands when said valve body is in central or neutral position, one of said grooves being adapted to be connected to said source of constant fluid pressure and the other of said grooves being adapted to be connected to drain, the wall of said chamber also being provided intermediate said first named grooves with a groove adapted to be connected to the motor.

6. A pilot valve as defined in claim 1 and wherein the wall of said chamber is provided with grooves covered by said end lands when said valve body is in central or neutral position and adapted to be connected to drain, the wall of said chamber further being provided with a central groove adapted to be connected to said source of constant fluid pressure and on each side of said central groove with grooves adapted to be connected to said motor while said valve body is provided with a central land covering said central groove when said valve body is in central or neutral position.

7. A pilot valve as defined in claim 1 and wherein the wall of said chamber substantially midway of the ends of said chamber is provided with a central groove adapted to be connected to said motor and on each side of said central groove with grooves one of which is adapted to be connected to drain and the other of which is adapted to be connected to said source of constant fluid pressure while said valve body is provided with a central land covering said central groove when said valve body is in central or neutral position.

8. In combination, a fluid motor having a cylinder and a piston rod extending into one end of said cylinder and provided with a piston relatively slidable in said cylinder, means connecting said one end of said cylinder to a source of constant fluid pressure, a pilot valve for controlling said motor and comprising a housing having a chamber therein, a conduit connecting one end of said chamber to a source of constant fluid pressure, said housing being provided with an outlet control nozzle communicating with the other end of said chamber, a shiftable valve body in said chamber and including at its opposite ends lands slidable therein, one land at said one end of said chamber being provided with a feed-back nozzle extending toward said one end of said chamber, spring means in the other end of said chamber acting on the other of said lands in opposition to the force acting on said one land, an uninterrupted bore communicating with said feed-back nozzle and extending longitudinally completely through said valve body and communicating with the said other land of said chamber, the wall of said chamber being provided with a pressure groove connected to said source of constant fluid pressure and with a groove connected to drain with the said grooves covered respectively by the end lands when said valve body is in central or neutral position, the wall of said chamber being provided with a third groove intermediate said first named grooves, a conduit interconnecting said third groove with the other end of said cylinder, and a control element cooperating with the outlet end of said outlet control nozzle and movable from a central normal position toward or away from said outlet end of said control nozzle to throttle or accelerate the normal outward flow of pressure fluid therefrom to automatically cause shifting of the valve body in either direction from a central or normal position thereof to control actuation of said motor.

9. In combination, a fluid motor having a cylinder and a piston rod extending into one end of said cylinder and provided with a piston relatively slidable in said cylinder, a pilot valve for controlling said motor and comprising a housing having a chamber therein, means connecting one end of said chamber to a source of constant fluid pressure, said housing being provided with an outlet control nozzle communicating with the other end of said chamber, a shiftable valve body in said chamber and including at its opposite ends lands slidable therein and an intermediate land also slidable in said chamber, one end land in said one end of said chamber being provided with a feed-back nozzle extending toward said one end of said chamber, spring means in the other end of said chamber acting on the other of said end lands in opposition to the force acting on said one end land, an uninterrupted bore communicating with said feed-back nozzle and extending longitudinally completely through said valve body and communicating with the said other end of said chamber, the wall of said chamber being provided with a pair of drain grooves and a central groove connected to said source of conduit fluid pressure, said drain grooves and said central groove being covered respectively when said valve body is in central or normal position by said end lands and said intermediate land, the wall of said chamber also being provided with annular grooves intermediate said drain grooves and said central groove, conduit means connecting said last mentioned annular grooves to said cylinder on opposite sides of the piston thereof, and a control element cooperating with the outlet end of said outlet control nozzle and movable from a central normal position toward or away from said outlet end of said control nozzle to throttle or accelerate the normal outward flow of pressure fluid therefrom to automatically cause shifting of the valve body in either direction from a central or normal position thereof to control actuation in either direction of said motor.

10. In combination, a fluid motor having a cylinder and a piston rod extending into one end of said cylinder and provided with a piston relatively slidable in said cylinder, means connecting said one end of said cylinder to a source of constant fluid pressure, a pilot valve for controlling said motor and comprising a housing having a chamber therein, means connecting one end of said chamber to a source of constant fluid pressure, said housing being provided with an outlet control nozzle communicating with the other end of said chamber, a shiftable valve body in said chamber and provided with end lands and a central land slidable in said chamber, one of said end lands at said one end of said chamber being provided with a feed-back nozzle extending toward said one end of said chamber, spring means in the other end of said chamber acting on the other of said end lands in opposition to the force acting on said one end land, an uninterrupted bore communicating with said feed-back nozzle and extending longitudinally completely through said valve body and communicating with the said other end of said chamber, the wall of said chamber being provided with a central annular groove covered by said central land when said valve body is in central or normal position, means interconnecting said central groove with the other end of said cylinder, the wall of said chamber on opposite sides of said central groove being provided with an annular groove connected to drain and an annular groove connected to said source of constant fluid pressure, and a control element cooperating with the outlet end of said outlet control nozzle and movable from a central normal position toward or away from said outlet end of said control nozzle to throttle or accelerate the normal outward flow of pressure fluid therefrom to automatically cause shifting of the valve body in either direction from a central or normal position thereof to control actuation of said motor in either direction.

References Cited in the file of this patent

UNITED STATES PATENTS

| | | |
|---|---|---|
| 2,625,136 | Moog | Jan. 13, 1953 |
| 2,675,652 | Chiappulini | Apr. 20, 1954 |
| 2,709,421 | Avery | May 31, 1955 |

FOREIGN PATENTS

| | | |
|---|---|---|
| 423,676 | Germany | Jan. 8, 1926 |
| 810,115 | France | Jan. 21, 1946 |